(12) United States Patent
Carreiro (10) Patent No.: US 8,708,285 B1
(45) Date of Patent: Apr. 29, 2014

(54) MICRO-UNMANNED AERIAL VEHICLE DEPLOYMENT SYSTEM

(75) Inventor: Paul J. Carreiro, Swansea, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 283 days.

(21) Appl. No.: 13/004,152

(22) Filed: Jan. 11, 2011

(51) Int. Cl.
*B64C 13/20* (2006.01)

(52) U.S. Cl.
USPC .......................................................... 244/190

(58) Field of Classification Search
USPC ......................................... 102/489; 244/190
See application file for complete search history.

(56) References Cited

U.S. PATENT DOCUMENTS

| | | | |
|---|---|---|---|
| 2,735,391 A * | 2/1956 | Buschers | 89/1.802 |
| 4,172,407 A | 10/1979 | Wentink | |
| 5,386,781 A | 2/1995 | Day | |
| 5,760,330 A | 6/1998 | Himmert | |
| 6,056,237 A * | 5/2000 | Woodland | 244/3.15 |
| 6,082,675 A * | 7/2000 | Woodall et al. | 244/137.4 |
| 6,498,767 B2 * | 12/2002 | Carreiro | 367/4 |
| 6,905,097 B2 * | 6/2005 | Blackwell-Thompson et al. | 244/173.1 |
| 6,957,609 B2 | 10/2005 | Ronn | |
| 7,032,521 B2 * | 4/2006 | Ronn et al. | 102/489 |
| 7,395,761 B2 * | 7/2008 | Bittle et al. | 102/489 |
| 7,494,089 B2 * | 2/2009 | Williams et al. | 244/3.16 |
| 8,082,848 B2 * | 12/2011 | Hlavacek et al. | 102/489 |

* cited by examiner

*Primary Examiner* — Tien Dinh
*Assistant Examiner* — Keith L Dixon
(74) *Attorney, Agent, or Firm* — James M. Kasischke; Michael P. Stanley (57) ABSTRACT

A micro-unmanned aerial vehicle deployment system is provided for a cruise missile having submunition compartments. The system includes a vehicle launch module releasable from the cruise missile submunition compartment. The vehicle launch system has a control circuit and at least one micro-unmanned aerial vehicle contained therein. Structure is provided in the launch module for deploying the micro-unmanned aerial vehicle. A separable tether can be joined between the cruise missile and the vehicle launch module that separates when subjected to tension after deployment of the vehicle launch module.

12 Claims, 6 Drawing Sheets

MICRO-UNMANNED AERIAL VEHICLE DEPLOYMENT SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to a device for deployment from a cruise missile and more particularly for submunition that is capable of deploying small unmanned aerial vehicles.

(2) Description of the Prior Art

Tomahawk cruise missile variant UGM 109D is designed to deliver four payload modules of six small submunitions each to multiple targets. Submunitions are positioned in a submunition compartment with a close sliding fit and are retained in the compartment by a submunition latch. The submunition is deployed by a charge positioned in the submunition compartment which moves the submunition into the slipstream around the missile. Once the submunition enters the slipstream around the missile, aerodynamic forces pull it away from the missile. A submunition is typically an explosive weapon, however, other uses have been contemplated for this capability.

U.S. Pat. No. 6,498,767 to Carreiro was issued for a "Cruise Missile Deployed Sonar Buoy". This patent teaches a sonar buoy adapted to be deployed by a cruise missile from its submunition compartment. The sonar buoy includes a flotation device for keeping a portion of the buoy afloat, a hydrophone, a transmitter for communicating contact and position information and releasable means for attaching the sonar buoy to the cruise missile. By means of this device, a means of monitoring littoral and other waters for enemy submarines and other threats is provided with a low degree of risk to friendly forces. A system for deploying this sonar buoy in a sonar buoy field is also disclosed.

Also relevant is U.S. Pat. No. 6,484,641 for a "Cruise Missile Downed Airman Decoy". This patent teaches that a cruise missile, such as the Tomahawk cruise missile, can be adapted to deploy decoys in an area as the missile progresses along its preprogrammed course. Each decoy is shaped to be compatible with and ejected from the Tomahawk missile submunition compartment and has a preprogrammed control unit operating a transmitter connected to an extendible antenna. False beacon signals and/or false message signals are transmitted from each of the decoys to deceive and confuse defensive forces, such as enemy searchers looking for a downed airman.

Unmanned aerial vehicles have been a recent addition to ground combat. Of relevance to the current invention are micro-unmanned aerial vehicles (MUAVs). Known MUAVs are less than six inches in length, with a maximum range of approximately seven miles and flight endurance of up to one hour. The MUAV can deploy useful micro payloads to a remote or otherwise hazardous location where it may perform any of a variety of missions, including reconnaissance and tagging high-value targets, bio-chemical detection and classification, battle damage imaging and assessment and search and rescue. For these purposes, the MUAV can be equipped with an appropriate sensor joined to a transmitter.

The MUAV is controlled externally by directional antennas from ground, surface ship, submarine, or airborne platforms. The MUAVs, acting alone or in small, cooperative groups, can provide reconnaissance and surveillance of inner city areas, serve as communication relays and place sensors on elevated surfaces.

Although the MUAV serves well in its intended purpose, one serious limitation of the MUAV is its limited range and endurance. Consequently, MUAVs must be deployed relatively close to their selected area of operation. It is desired that means be provided to extend the range of operation of the weapon system, such as the weapon system deploying MUAVs.

SUMMARY OF THE INVENTION

Accordingly, it is an object of the present invention to provide means for extending the range of operation of a weapon system deploying MUAVs.

Another object of the present invention is to provide means for adapting a system for dispensing submunitions to dispensing submunitions such as MUAVs having a limited range.

In accordance with the present invention, there is provided a micro-unmanned aerial vehicle deployment system for a cruise missile having submunition compartments. The system includes a vehicle launch module releasable from the cruise missile submunition compartment. The vehicle launch system has a control circuit and at least one micro-unmanned aerial vehicle contained therein. Structure is provided in the launch module for deploying the micro-unmanned aerial vehicle. The system can include a separable tether joined between the cruise missile and the vehicle launch module that separates when subjected to tension after deployment of the vehicle launch module.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

As discussed previously, deploying multiple Micro-Unmanned Aerial Vehicle (MUAV) has many benefits, but there are limitations concerning its range of operation. The present invention eliminates the range limitation by adapting a system for dispensing multiple short range vehicles, into a known submunition deployment system. The known submunition deployment system utilizes a cruise missile, such as a Tomahawk variant UGM 109D. This type of missile can be launched from submarine, surface or airborne locations. The present invention allows the MUAV to be insertable into and ejected from enclosed spaces of the missile both in a close sliding fit. More particularly, the present invention eliminates the problem of limited range by employing a cruise missile to dispense multiple MUAVs. The operation of the present invention may be better understood by first referring to FIG. 1.

Figure 1:
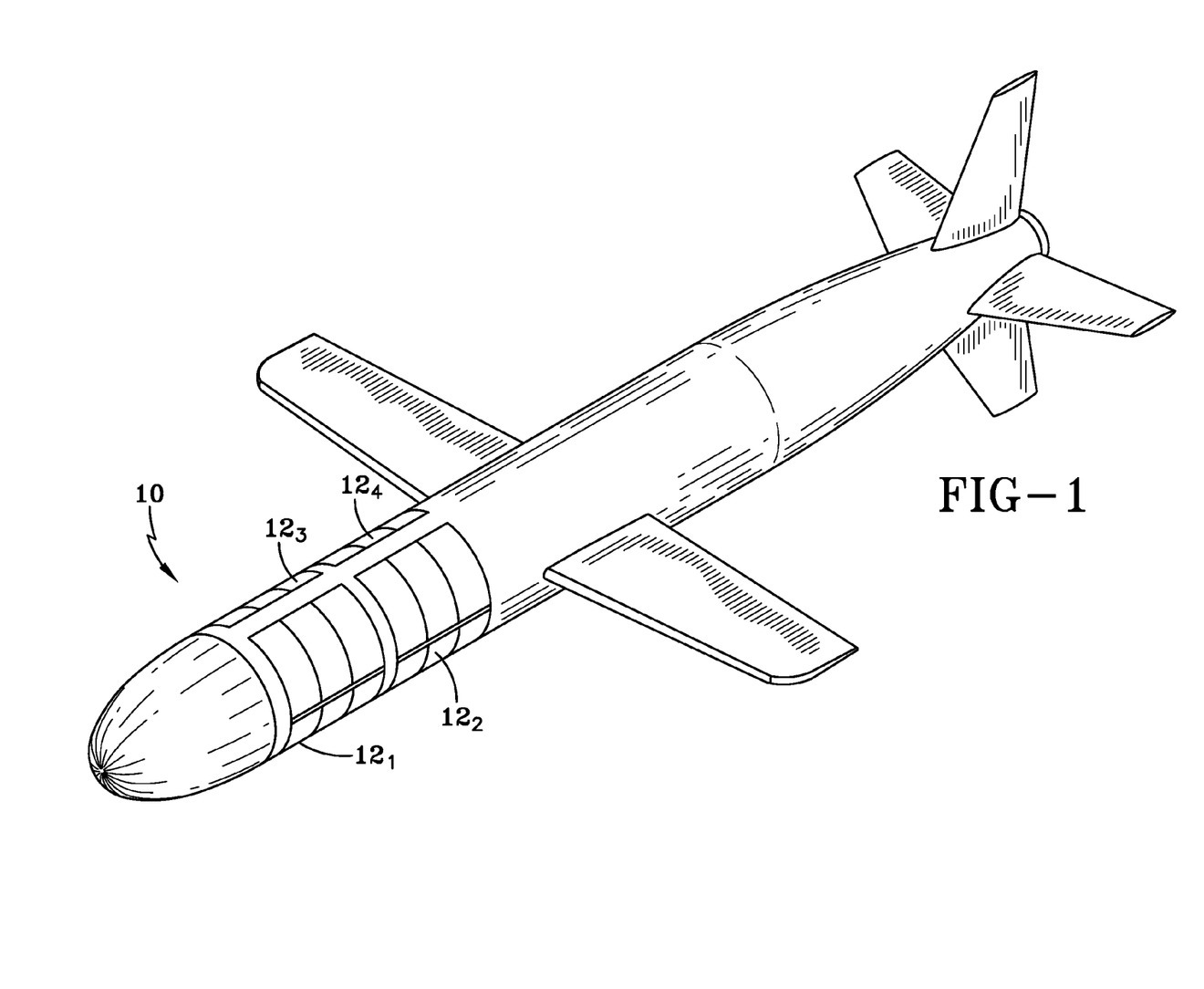
FIG. 1 illustrates some of the features of a cruise missile (specifically the Tomahawk UGM-109D variant or the like)

FIG. 1 generally illustrates a cruise missile 10 that has payload bays, such as the known Tomahawk variant UGM 109D cruise missile, which features four payload bays $12_1$, $12_2$, $12_3$, $12_4$ displaced about the fuselage of the cruise missile 10. The payload modules $12_1$, $12_2$, $12_3$, $12_4$ are enclosed by defined spaces of the Tomahawk missile 10 having predetermined dimensions. The features of the payload modules $12_1$, $12_2$, $12_3$, $12_4$ may be further described with reference to FIG. 2 generally illustrating a payload module $12_1$.

Figure 2:
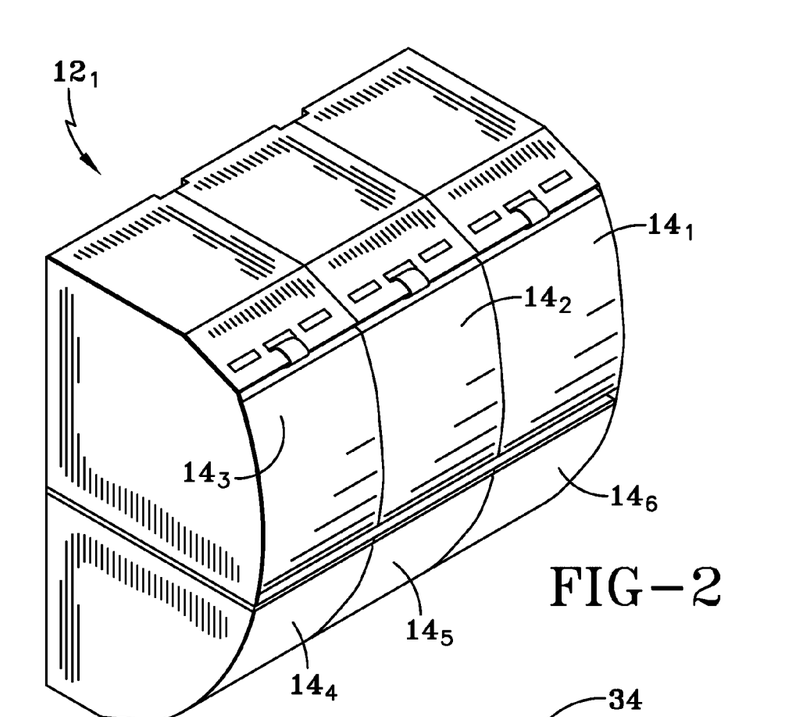
FIG. 2 generally illustrates features of the payload module of the cruise missile.

As seen in FIG. 2, the payload module, such as $12_1$, has six submunition compartments $14_1$, $14_2$, $14_3$, $14_4$, $14_5$ and $14_6$. Each of the six submunition compartments can hold a submunition that is separately ejectable from the defined payload module identified typically at $12_1$. In general, the present invention provides a module assembly that allows one submunition to support and dispense multiple micro-unmanned aerial vehicles.

Figure 3:
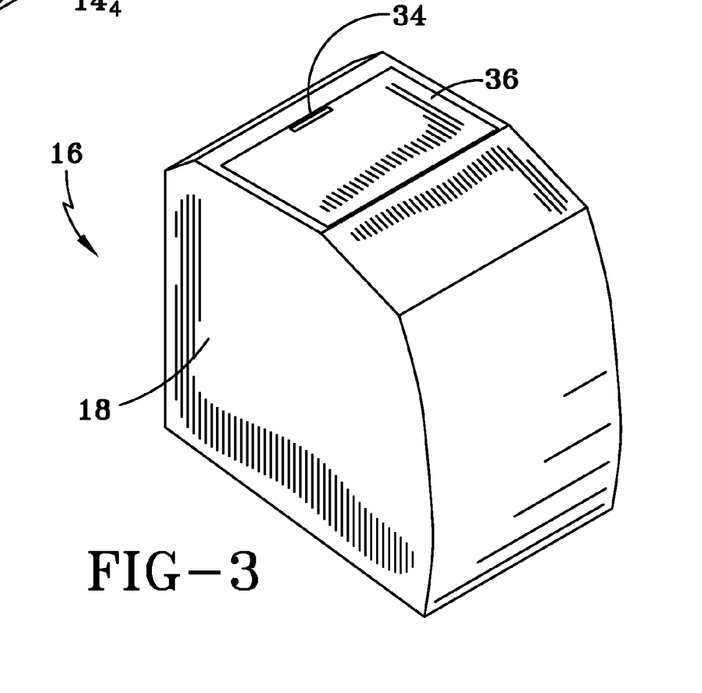
FIG. 3 generally illustrates a Micro Unmanned Aerial Vehicle (MUAV) module.
Figure 4:
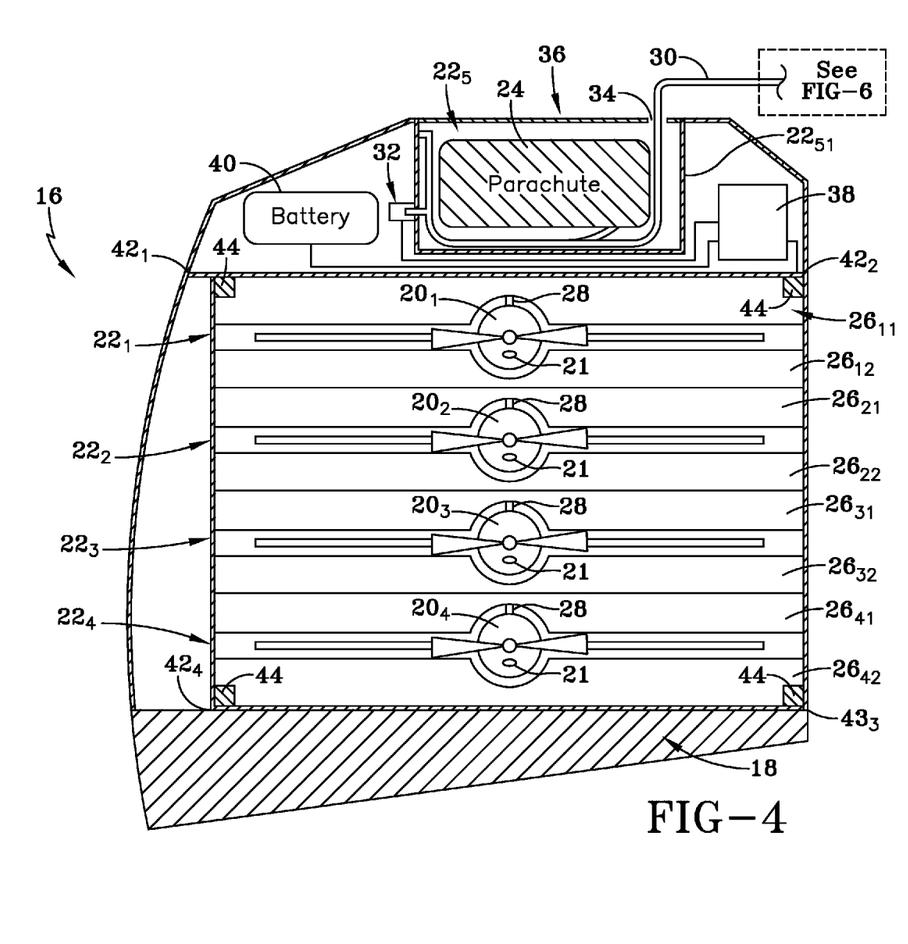
FIG. 4 schematically illustrates the MUAV module of the present invention prior to the deployment thereof.

FIG. 3 and FIG. 4 show the module assembly 16 that has exterior dimensions that substantially match the interior dimensions of one submunition compartment $14_1 \ldots 14_6$. Assembly 16 should have a close, sliding fit within a submunition compartment. This allows assembly 16 to be inserted into and to be ejectable from the enclosed submunition compartment $14_1 \ldots 14_6$. One module assembly 16 can be positioned in each submunition compartment $14_1 \ldots 14_6$. The details of the module assembly 16 of the present invention may be further described with reference to FIG. 4, which is a cross-sectional representation of the module assembly 16 prior to deployment.

The module assembly 16 comprises a shell 18 which has the substantially same external dimensions as the internal dimensions of submunition payload $14_1 \ldots 14_6$. The shell 18 provides environmental protection to the internal components and acts as a launch platform for MUAVs. These MUAVs are shown in FIG. 4 as MUAV $20_1$, $20_2$, $20_3$ and $20_4$. MUAVs $20_1$, $20_2$, $20_3$ and $20_4$ are shown with a propeller and wings; however, another propulsion means such as a ducted fan, jet engine, rocket engine or the like could be used. MUAVs can have sensors 21 positioned thereon. MUAVs can be remotely controlled and have transmitters allowing them to transmit sensor signals.

The internal volume of module assembly can be divided by shell 18 into five compartments $22_2$, $22_2$, $22_3$, $22_4$ and $22_5$. Compartments $22_2$, $22_2$, $22_3$, and $22_4$ can be occupied by a respective MUAV $20_2$, $20_2$, $20_3$ and $20_4$. Compartment $22_5$ is occupied by a parachute 24.

Spacers $26_{11}$, $26_{22}$, $26_{22}$, $26_{22}$, $26_{32}$, $26_{32}$, $26_{42}$ and $26_{42}$, stacked alternately in compartments $22_2$, $22_2$, $22_3$, and $22_4$, to hold MUAVs $20_2 \ldots 20_4$. More particularly, compartment $22_2$ holds spacer $26_{22}$ and $26_{22}$, compartment $22_2$ holds spacers $26_{22}$ and $26_{22}$, compartment $22_3$ holds spacers $26_{32}$ and $26_{32}$, and compartment $22_4$ holds spacers $26_{42}$ and $26_{42}$. Each of the spacers $26_{22} \ldots 26_{42}$ is preferably comprised of an elastomeric material and each pair of spacers $26_{22}$ and $26_{22}$; $26_{22}$ and $26_{22}$; $26_{32}$ and $26_{32}$; and $26_{42}$ and $26_{42}$ are oppositely facing each other and confine the movement of their respective MUAV $20_2$, $20_2$, $20_3$ and $20_4$.

The fuselage of each MUAV $20_1$, $20_2$, $20_3$ and $20_4$ contains a normally closed plunger-type activation switch 28. When compressed by the elastomeric spacers $26_{11} \ldots 26_{42}$ within the MUAV compartments, the switches 28 remain in the open, or off position. When extended, by the separation of the spacers $26_{11} \ldots 26_{42}$ and MUAVs, $20_1 \ldots 20_4$ to be further described hereinafter, the switches 28 extend so as to activate the internal propulsion motor of their respective MUAV $20_1 \ldots 20_4$.

The parachute compartment $22_5$ contains the parachute 24, a lanyard 30 and an arming-switch 32. The lanyard 30 attaches to the wall of parachute compartment $22_5$, loops under the parachute 24 and exits the compartment $22_5$ through a slot 34 in a tear-through cover 36 of the compartment $22_5$. The tear-through cover 36 holds the parachute 24 in the compartment $22_5$ prior to deployment to be further described hereinafter. Both the parachute 24 and the arming-switch 32 are secured to the lanyard 30.

The module assembly 16 shown in FIG. 4 further comprises a control unit 38 and a battery 40. The control unit 38 provides all internal control for the module assembly 16 and has timing means for ejecting the respective module assembly 16 from the submunition compartment 14 at selectable times. Assembly 16 ejection can also be controlled by remote communication from a support platform. The battery 40 provides all of the internal power necessary to operate the module assembly 16.

The module assembly 16, in particular the shell 18, has walls with four-spaced apart corners $42_1$, $42_2$, $42_3$, and $42_4$ each having a latch 44. The latches 44 operate in their off-state to hold the walls of the shell 18 together and when in their on-state cause the walls to separate from each other. The latches 44 can be pyro-activated devices. When activated (on-state), the latches 44 allow complete separation of the walls of the shell 18.

Figure 5:
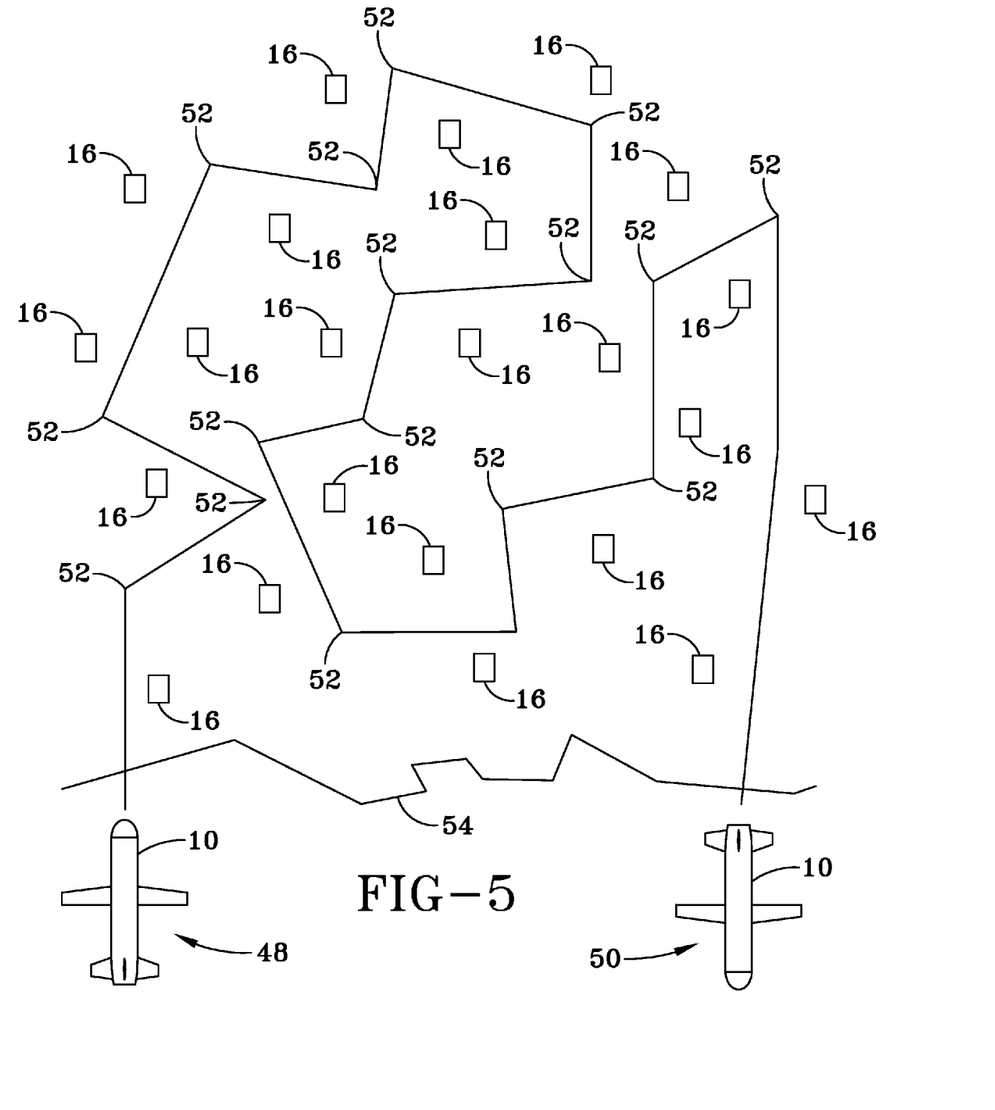
FIG. 5 schematically illustrates a flight path of a cruise missile dispensing multiple MUAVs there along.

The launching platform plots waypoints for a flight path over the desired area, or areas, and launches the cruise missile 10 outfitted with module assembly 16 shown in FIGS. 3 and 4. FIG. 5 shows an example mission profile 46. More particularly, FIG. 5 illustrates the mission profile 46 as including an initial position 48 of the cruise missile 10 and a final position 50 of the cruise missile 10. The mission profile 46 further includes multiple waypoints 52. The cruise missile can eject one module assembly 16 between waypoints 52. Further details of the operation of the present invention may be described with reference to FIG. 6.

Figure 6:
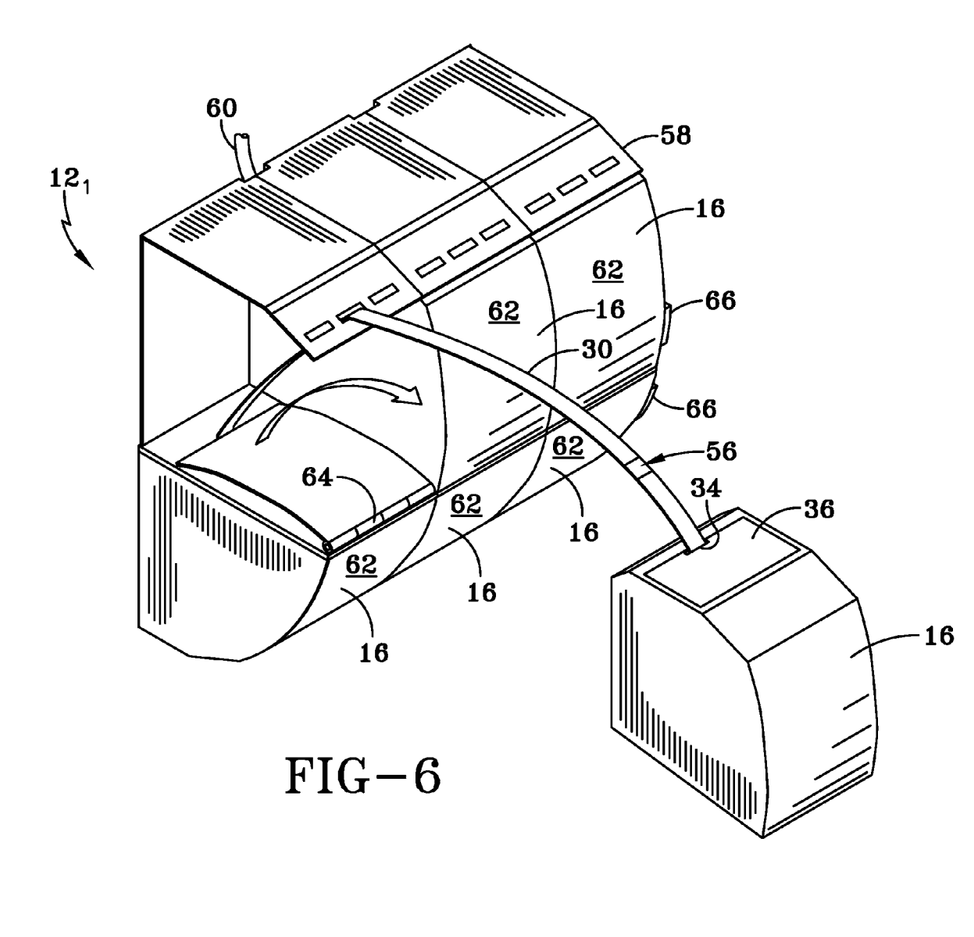
FIG. 6 illustrates details associated with the MUAV module ejection.

FIG. 6 generally illustrates the payload module $12_1$, previously discussed with reference to FIG. 2. FIG. 6 further illustrates the module assembly 16 described with reference to FIGS. 3 and 4, ejected from the submunition compartment $14_1$.

FIG. 6 further illustrates the payload module $12_1$ as housing module assemblies 16 in submunition compartments $14_1$, $14_2$, $14_4$, $14_5$ and $14_6$ of FIG. 2. The location for submunition compartments $14_3$ and $14_4$ is shown as being partially broken away so as to illustrate further details of both the payload module $12_1$ and the module assembly 16.

As seen in FIG. 6, the module assembly 16 has tear-through cover 36 (previously discussed with reference to FIG. 4) that allows the exit of the lanyard 30 from opening 34 (both previously discussed with reference to FIG. 4). The lanyard 30 has a weak point 56 (to be further described with reference to FIGS. 7 and 8) and has its distal end attached to latch 58 of the payload module 12₁.

As further seen in FIG. 6, the payload module $12_1$ comprises control lines 60, closure doors 62, and hinges 64 operatively cooperating with respective closure doors 62, and mounting lugs 66. Prior to deployment, the exterior surface of assembly 16 acts as the exterior surface of missile 10. After deployment, closure door 62 must be moved into place in order to preserve missile 10's aerodynamic characteristics.

FIG. 6 primarily illustrates the status of the module assembly 16 just after ejection. The module assembly 16 operation during and after ejection, is similar to the operation of known systems such as that used on the Tomahawk cruise missile variant UGM-109D. Unlike the known system, the current invention allows ejection of less than all of the module assemblies.

Upon ejection, the lanyard 30, of the present invention, tethers the module assembly 16 that is ejected to the respective payload module closure door 62. As seen with simultaneous reference to FIGS. 6 and 7, when taut, the lanyard 30 pulls the respective closure door 62 shut, while simultaneously forcing the parachute 24 through the tear-through cover 36 and also pulling the pin 68 on the arming switch 32 thereby activating the control unit 38.

Figure 7:
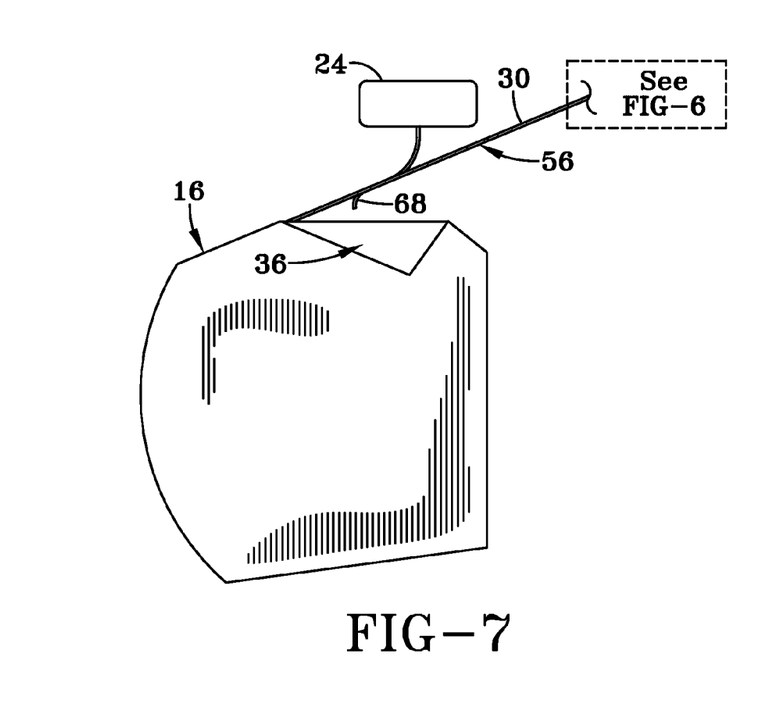
FIG. 7 illustrates the MUAV module status following ejection thereof from the missile.

With the closure door 62 shut and the parachute 24 clear of the module assembly 16, as seen in FIG. 7, the lanyard 30 breaks at the weak-point 56 leaving the module assembly 16 to fall and deploy the parachute 24. A closure door latch 58, shown in FIG. 6, holds the closure door 62 closed. Once closed and latched, the closure door 62 aerodynamically fairs with the airframe of the missile 10 for the rest of the flight shown in FIG. 5.

Figure 8:
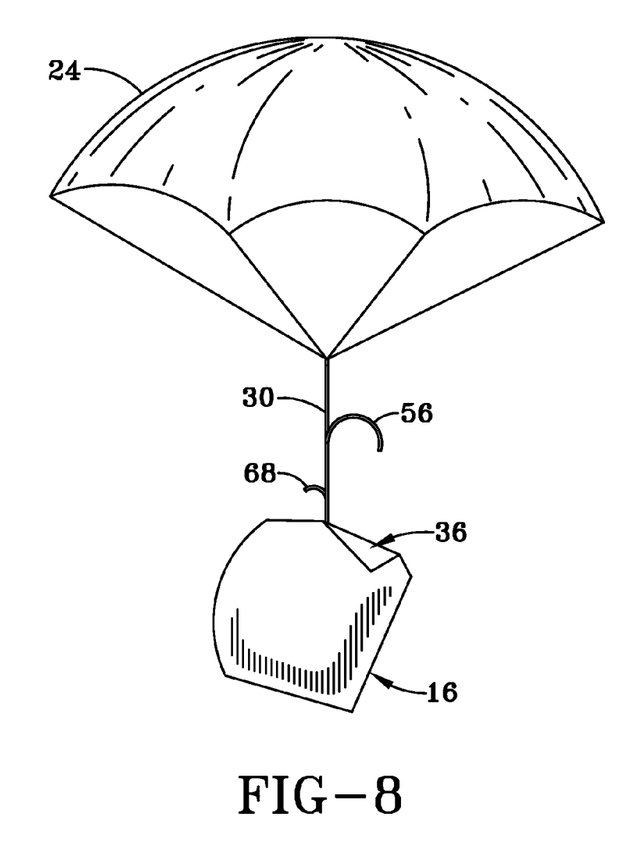
FIG. 8 illustrates the MUAV module status after an associated parachute has been deployed.

With the parachute 24 deployed, as shown in FIG. 8, the module assembly 16 floats toward earth. After a brief delay, when the module assembly 16 reaches a pre-programmed altitude, or on remote command, the control unit 38 fires the latches 44 thereby separating the walls of the shell 18. Falling free of the module assembly 16, the stacked MUAVs $20_1$, $20_2$, $20_3$, and $20_4$ separate from their elastomeric isolators $26_{22}$ . . . $26_{42}$ extending their activation switches 28 and starting the respective motors enclosed in the MUAVs $20_2$, $20_2$, $20_3$, and $20_4$.

It should now be appreciated that the practice of the present invention provides a module assembly 16 that adapts a system employed for dispensing submunitions from a cruise missile to a micro-unmanned aerial vehicle system having a limited range capability. The module assembly 16 allows the range of the system to be increased to that of the range utilized by the cruise missile, while at the same time providing for the proper dispensing of submunitions, that is, MUAVs.

It should be further appreciated that although the invention has been described for adapting the utilization of Tomahawk missile to the needs of a weapon system employing MUAVs other vehicles such as those found in airborne applications may be utilized to increase the present limited operating range of the weapon systems employing MUAVs.

It will be understood that many additional changes in the details, materials, steps and arrangement of parts, which have been herein described and illustrated in order to explain the nature of the invention, may be made by those skilled in the art within the principle and scope of the expressed in the appended claims.

What is claim is:

1. A micro-unmanned aerial vehicle deployment system for a cruise missile having submunition compartments therein, said system comprising:

a vehicle launch module positionable in one said submunition compartment of said cruise missile and deployable from said cruise missile;
a control circuit positioned in said vehicle launch module;
at least two micro-unmanned aerial vehicles stacked in said vehicle launch module such that the bottom surface of at least one micro-unmanned vehicle is proximate the top surface of at least one other vehicle, said micro-unmanned vehicles being oriented in the same direction, said micro-unmanned aerial vehicles each having a propulsion means and wings fully configured for flight;
a micro-unmanned vehicle deployment means joined to said control circuit and positioned to deploy at least one micro-unmanned aerial vehicle; and
releasable means attachable between said vehicle launch module and said cruise missile.

2. The system of claim 1 wherein said micro-unmanned aerial vehicle deployment means further comprises:

a shell having separable walls defining the portion of the vehicle launch module having said at least one micro-unmanned aerial vehicle positioned therein; and
latches joined to said control circuit and to said separable walls of said shell for separating said walls after deployment.

3. The system of claim 2 wherein said latches are pyrotechnic devices that separate said walls of said shell when activated.

4. The system of claim 2 further comprising at least one activation switch joined between said shell and each said at least one micro-unmanned aerial vehicle, said switch being capable of activating said associated at least one micro-unmanned aerial vehicle on release from said shell.

5. The system of claim 2 wherein said micro-unmanned aerial vehicle deployment means further comprises a plurality of spacers positioned between said shell and said at least one micro-unmanned aerial vehicle.

6. The system of claim 5 further comprising at least one activation switch joined between said shell and each said at least one micro-unmanned aerial vehicle, said switch being capable of activating said associated at least one micro-unmanned aerial vehicle on release from said shell.

7. The system of claim 1 further comprising a parachute joined to said vehicle launch module, said parachute being deployable to slow the descent of said vehicle launch module upon deployment of said vehicle launch module.

8. The system of claim 1 further comprising an activation switch joined between said micro-unmanned aerial vehicle deployment means and said at least one micro-unmanned aerial vehicle, said switch being capable of activating said associated at least one micro-unmanned aerial vehicle on release from said micro-unmanned aerial vehicle deployment means.

9. The system of claim 1 wherein said micro-unmanned aerial vehicle comprises an aerial vehicle that is remotely controllable and capable of controlled flight.

10. The system of claim 9 wherein:

said micro-unmanned aerial vehicle has at least one environmental sensor positioned thereon; and
said micro-unmanned aerial vehicle is capable of transmitting information received from said environmental sensor.

11. The system of claim 1 further comprising a separable tether joined between said cruise missile and said vehicle launch module, said tether separating when being subjected to tension after deployment of said vehicle launch module.

12. The system of claim 11 further comprising a parachute joined to said vehicle launch module, said separable tether being operable to help deploy parachute and slow the descent of said vehicle launch module upon deployment of said vehicle launch module.

\* \* \* \* \*